(12) United States Patent
Martin et al.

(10) Patent No.: US 8,159,737 B2
(45) Date of Patent: Apr. 17, 2012

(54) CONTROLLING THE PHASE OF OPTICAL CARRIERS

(75) Inventors: Richard D. Martin, Newark, DE (US); Christopher A. Schuetz, Newark (DE); Dennis W. Prather, Newark, DE (US); Thomas E. Dillon, Newark (DE)

(73) Assignee: Phase Sensitive Innovations, Inc., Newark, DE (US)

( * ) Notice: Subject to any disclaimer, the term of this patent is extended or adjusted under 35 U.S.C. 154(b) by 0 days.

(21) Appl. No.: 12/762,804

(22) Filed: Apr. 19, 2010

(65) Prior Publication Data

US 2010/0271683 A1    Oct. 28, 2010

Related U.S. Application Data

(60) Provisional application No. 61/172,985, filed on Apr. 27, 2009.

(51) Int. Cl.
  *G02F 1/01*   (2006.01)
  *G02F 1/03*   (2006.01)
(52) U.S. Cl. ............ 359/239; 359/279; 359/341.1; 359/341.32
(58) Field of Classification Search .......... 359/237–239, 359/618, 341.1, 341.32, 341.4, 349; 356/349, 356/450, 451, 493, 495, 496, 498, 521; 385/3, 385/43; 250/201.9, 395, 396 R, 398
See application file for complete search history.

(56) References Cited

U.S. PATENT DOCUMENTS

| 3,659,947 | A  | * | 5/1972 | Neumann | 356/457 |
| 4,340,304 | A  | * | 7/1982 | Massie | 356/489 |
| 4,748,686 | A  |   | 5/1988 | Glomb | |
| 4,854,677 | A  | * | 8/1989 | O'Meara | 359/242 |
| 5,127,731 | A  | * | 7/1992 | DeGroot | 356/486 |
| 5,270,790 | A  | * | 12/1993 | Matsumura | 356/452 |
| 6,233,085 | B1 | * | 5/2001 | Johnson | 359/279 |
| 6,992,778 | B2 | * | 1/2006 | Nahum | 356/512 |
| 7,187,492 | B1 |   | 3/2007 | Shay | |
| 7,209,239 | B2 | * | 4/2007 | Hwang et al. | 356/495 |
| 7,327,464 | B2 | * | 2/2008 | Hwang et al. | 356/495 |
| 7,436,588 | B2 |   | 10/2008 | Rothenberg et al. | |
| 7,440,478 | B2 | * | 10/2008 | Suzuki et al. | 372/25 |
| 7,768,699 | B2 | * | 8/2010 | Suzuki et al. | 359/337.22 |
| 7,903,257 | B2 |   | 3/2011 | de Boer et al. | |
| 7,965,435 | B2 | * | 6/2011 | Schuetz et al. | 359/279 |
| 2009/0201575 | A1 | * | 8/2009 | Fermann et al. | 359/341.32 |
| 2011/0073772 | A1 | * | 3/2011 | Schuetz et al. | 250/395 |

OTHER PUBLICATIONS

M. Blanchard et al., Phase calibration of arrays at optical and millimeter-wavelengths, J. Opt. Soc. Am A 13, 1593-1600 (1996).
Yu et al., "Coherent beam combining of large Number of PM fibres in 2-D fibre array," Electronic Letters, vol. 42, No. 18, pp. 1024-1025 (Aug. 31, 2006).

* cited by examiner

*Primary Examiner* — Loha Ben
(74) *Attorney, Agent, or Firm* — Connolly Bove Lodge & Hutz LLP (57) ABSTRACT

A system and method for locking the relative phase of multiple coherent optical signals, which compensates for optical phase changes induced by vibration or thermal changes in the environment.

24 Claims, 7 Drawing Sheets

CONTROLLING THE PHASE OF OPTICAL CARRIERS

CROSS REFERENCE TO RELATED APPLICATIONS

This application claims the benefit of priority of U.S. Provisional Patent Application No. 61/172,985, filed on Apr. 27, 2009, the entire contents of which are incorporated herein by reference in their entirety.

FIELD OF THE INVENTION

The invention generally relates to a distributed aperture imaging system using optical up-conversion, which includes a system and method of phase locking a plurality of optical sources.

BACKGROUND OF THE INVENTION

In recent years, interest has grown in the use of millimeter-waves for imaging applications. Millimeter-waves are electromagnetic radiation characterized by wavelengths in the range of from 1 to 10 millimeters and having corresponding frequencies in the range of 300 GHz to 30 GHz. Millimeter-waves have the capability of passing through some types of objects which would stop or significantly attenuate the transmission of electromagnetic radiation of other wavelengths and frequencies. For example, millimeter-waves pass through clothing with only moderate attenuation, are capable of penetrating slight depths of soil, and are not obscured or adversely influenced by fog, cloud cover and some other types of visually-obscuring meteorological conditions.

Dielectric materials such as plastics, ceramics, and organic materials will cause some reflection of the waves, and some transmission, so they will be seen as partially transparent. Millimeter-waves are non-ionizing, and effective imaging systems can be operated at extremely low power levels. The IEEE standard for power density levels in this frequency range is less than 10 $mW/cm^2$.

Generally, a millimeter-wave imaging system includes a lens or equivalent focusing element used to focus radiation from the field of view onto a two-dimensional array of imaging elements disposed in the image plane of the lens. Each array element provides a continuous electrical signal responsive to the radiation incident thereon. The output signals of the detectors illustratively are used to drive a video display unit wherein each picture element (pixel) of the displayed image represents radiation from the portion of the image incident on a given detector. That is, the image formed by the lens on the detector array is converted to signal outputs from individual detectors, which are mapped one-to-one to corresponding pixels of a video display.

Millimeter-waves travel, or propagate, through space and thus, are generally directed or guided by an antenna. The antenna contains components such as millimeter-wave stripline circuitry. A receiving antenna receives millimeter-wave radiation and directs the radiation to appropriate instruments for further processing. The transmitting antenna works in reverse fashion.

Various millimeter-wave imaging systems have been studied and developed in industry. In the research article "Phase calibration of arrays at optical and millimeter-wavelengths," J. Opt. Soc. Am. A 13, 1593-1600 (1996), by M. Blanchard, A. H. Greenaway, R. N. Anderton, and R. Appleby, the authors designed aperture experiments with the use of optical and millimeter-wavelengths to synthesize quality images with an array of antennas. They noted that phase calibration of arrays is important to produce images of consistently good quality. Therefore, their approach to phase calibration was that of redundant spacings calibration (RSC), which can be applied at any electromagnetic wavelength. However, their experimental technique has proven difficult and expensive to implement.

In particular, millimeter-wave frequencies, in the form of electronic signals, are generally transmitted in rigid waveguide or stripline structures, which may be difficult to handle, costly, bulky, and heavy. Also, frequency conversion of modulation signals to and from a millimeter-wave carrier is generally done in several discrete stages, due to the bandwidth limitations of electronic mixers. This complicates the construction of a millimeter-wave transmitter or receiver. Further, it is generally impractical to transmit millimeter-wave signals for long distances on metallic waveguides.

Consequently, in some conventional systems, up-conversion may be performed in close proximity to the radiating aperture, and a lower-frequency intermediate frequency (IF) may often be transported on coaxial cables to and from the antenna site. As a result, a stable multiplier chain would generally be located in close proximity to the antenna aperture and supplied with a stable frequency reference. Thus, although there are many advantages of using millimeter-wave frequencies, this type of system architecture may be fundamentally incompatible with the harsh environments that antennas often endure.

Research studies have also reported on the technique of optical up-conversion in imaging systems. In up-conversion, an object under investigation may be illuminated with radiation at a first frequency, and the image beam carrying the image information may be converted to a higher frequency at which it is more amenable to detection and processing.

Another technique, in an attempt to resolve problems with imaging system, is the use of a millimeter-wave analog of an infrared (IR) focal plane array (FPA) or scanned staring systems. However, such systems require a volumetric increase in imager size and, subsequently, weight to improve imager resolution. However, the FPA approach may use very long, e.g., minutes, integration times. Further, the millimeter-wave FPA approach may not provide an economically viable solution for millimeter-wave imaging. Thus, such systems are largely impractical for many applications.

Distributed aperture approaches which synthetically reproduce image data from an array of detectors are currently under development for millimeter-wave sounding applications. Image reconstruction for distributed imaging methodologies requires the capture of both magnitude and phase of millimeter-wave field at each element of the array. Additionally, captured field information must be post-processed with large correlation engines to recover the original scene. Current distributed aperture images systems utilize distributed local oscillators (LO) and mixers to down-convert the captured field data to low intermediate frequency where it is digitally recorded. Subsequent, cross-correlators are required to regenerate the image data.

Therefore, in light of the above system requirements, it would be desirable develop a millimeter-wave imaging system with the use of optical up-conversion of the millimeter-wave signals, which does not require expensive correlators and time consuming post-processing, and enables the use of lightweight, low loss optical fibers to route signals.

Further, phase calibration or phase control (also referred to as phase locking) has been proposed in research. For instance, some systems may employ some type of phase control that aligns the phase of each of the beams in individual fibers to provide a coherent beam. Typically, the phase of each beam in each fiber may be adjusted in order to phase-lock each beam to a common reference beam. Known coherent fiber array lasers are generally continuous-wave (CW) lasers where each of the individual fiber beams is on for a period of time that is long enough to measure the phase of the fiber beams, and to adjust the phase of each beam to phase-lock to the reference beam.

In an article by Yu et al., "Coherent beam combining of large number of PM fibres in 2-D fibre array," Electronic Letters, Aug. 31, 2006, Vol. 42, No. 18, pp 1024-1025, phase control of a fiber array using a CCD camera and a tilted reference beam was noted as having been demonstrated in research. However, the technique of Yu et al. is hampered by the refresh rate of the camera, lower phase precision and difficulty inducing different relative phases on each channel.

In addition to the limitations of the background art discussed above, new techniques to lock the phase of each of the channel's optical carrier may be helpful or desirable. In particular, phase locking of each of the channel optical carrier may be useful to preserve the detected millimeter-wave phase and allow for the recreation of the millimeter-wave image.

SUMMARY OF THE EMBODIMENTS OF THE INVENTION

The system and method of embodiments of the invention enable the creation of millimeter-wave distributed aperture imaging systems using optical up-conversion. The system and method is a less expensive approach to other imaging systems, such that less equipment is required in a hostile environment and the use of expensive environmental control equipment is limited. Embodiments of the present invention may provide a system and a method that overcomes the aforementioned limitations and fills the aforementioned needs by providing a system and/or method to lock the relative phase of multiple coherent optical signals. Embodiments of the invention provide a means to compensate for optical phase changes induced by vibration or thermal changes in the environment.

These, and other, embodiments and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The objects, features and advantages of the present invention will be apparent from the following detailed descriptions of the preferred aspect of the invention in conjunction with reference to the following drawings, where:

FIG. 3, which includes

DETAILED DESCRIPTION OF THE EMBODIMENTS

The present invention and the various features and advantageous details thereof are explained more fully with reference to the non-limiting embodiments that are illustrated in the accompanying drawings and detailed in the following description.

Optical Up-Conversion

In the invention, several challenges and limitations of other imaging systems are circumvented with an alternate approach to distributed aperture imaging (DAI) based on optical up-conversion techniques. Unlike the common heterodyne down conversion techniques used in radiometers, one non-limiting approach described herein is the use of an electro-optic modulation technique to convert received millimeter-wave radiation into sidebands on an optical carrier. Such a technique maintains the benefits of distributed aperture approaches, described in exemplary embodiments of the invention below, while providing many potential advantages over digital heterodyne correlation imaging. Moreover, optical up-conversion allows for the use of lightweight, flexible fiber optics for the routing of optical energy both before and after millimeter-wave encoding, thereby eliminating the need for bulky LO distribution cables. Also, optical processing techniques may be used to provide real-time correlation engines using simple optical lenses and cameras.

In the optical up-conversion process, which may be based on commercial electro-optic modulators, modulators may operate, in a similar fashion to heterodyne mixers, by shifting the millimeter-wave radiation to another frequency. This shifting eases processing while preserving both amplitude and phase information of the captured signal. To verify the transfer of the complex millimeter-wave field to the optical domain, the components of the optical modulation process must first be understood.

Electro-optic modulation converts energy into the sidebands by imposing a phase change, $\Delta\phi$, to the optical field proportional to the applied millimeter-wave field described by Equation (1), as follows:

$$\Delta\phi = mE_m \cos(\omega_m t + \phi_m), \quad (1)$$

where m is a modulation constant dependent on the properties of the modulator and the efficiency of the collection antenna, and $E_m$, $\omega_m$, and $\phi_m$ are the strength, frequency, and phase of the incident millimeter-wave field, respectively. Thus, the output field $E_o$, of the electro-optic modulator may be described in Equation (2), as follows:)

$$E_o = E_{opt} e^{j\omega_{opt} t + j(\Delta\phi + \phi_{opt})} = E_{opt} e^{j\omega_{opt} t + jmE_m \cos(\omega_m t + \phi_3)}, \quad (2)$$

where $E_{opt}\exp(j\omega_{opt}t+\varnothing_{opt})$ describes the optical field incident on the modulator. Using Fourier expansion techniques and assuming a small imposed millimeter-wave field, the field strength of the imposed first-order sideband may be shown as:

$$E_{o,FSB} = \frac{jmE_{opt}}{2}(E_m e^{j\omega_{opt}t+j(\Delta\phi+\phi_{opt})}), \quad (3)$$

The above Equation (3) can be interpreted as the initial complex millimeter-wave field scaled in amplitude by a factor $mE_{opt}/2$ and in wavelength by a factor $(\omega_{opt+}\omega_m)/\omega_m$. In addition, a phase component, due to the optical path length, is included. Wavelength scaling allows smaller components, such as fiber optic waveguides, to replace bulky coaxial or metallic waveguides. The amplitude scaling, for reasonable optical powers, can be close to unity and low-noise photo detectors enable the detection of low power millimeter-wave signals.

Figure 1:
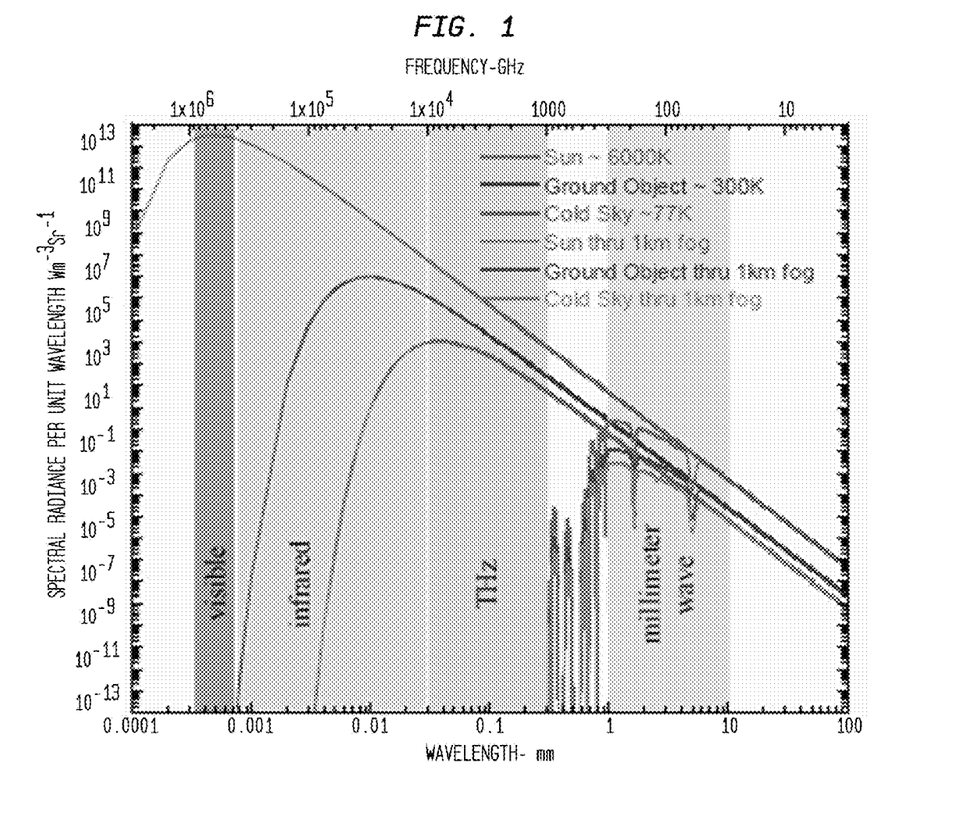
FIG. 1 is a graph of spectral bands in the millimeter-wave field, in which atmospheric absorption is shown as relatively low.

Spectral bands in the millimeter-wave field, in which atmospheric absorption is relatively low, are shown in the graph of FIG. 1. The graph provides a plot of naturally emitted "black body" radiation for an object at 6000K, 300K (terrestrial), and 77K (cold sky), and how much energy passes through 1 km of fog. The visible, infrared, and THz wavelengths are attenuated significantly more than millimeter-waves.

DAI Using Optical Up-Conversion

Figure 2:
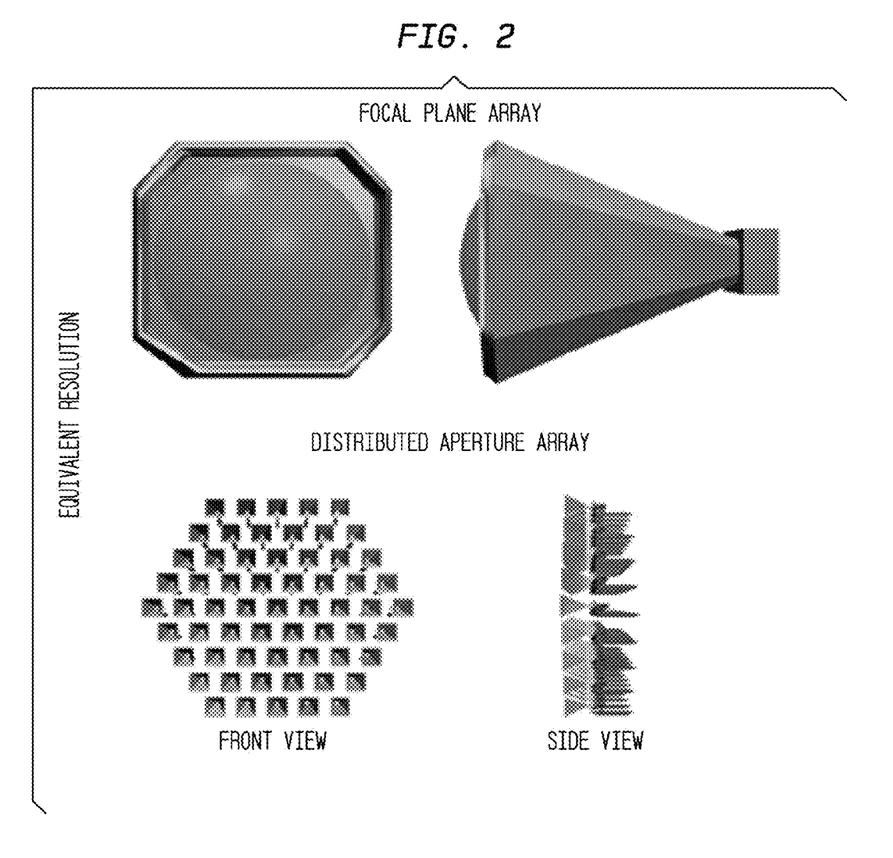
FIG. 2 is comparative illustration of a standard focal plane array and the distributed aperture array used in the distributed aperture imaging approach in an embodiments of the invention.

In further exemplary embodiments, a useful application of optical up-conversion to millimeter-wave images comes from the benefits that can be obtained in DAI techniques. The DAI approach may be used over a standard FPA. In particular, a FPA may use a lens, larger volume, and an expensive millimeter-wave detector for each pixel, as shown in the illustration in FIG. 2. However, the advantages of a DAI may include increased resolution without a lens and the volumetric scaling of size and weight; field amplitude and phase may be captured at discrete points; enabling a flat or conformal, high resolution imaging system; and a lower number of millimeter wave components needed in the imaging system.

Optical processing of the distributed aperture data has been demonstrated in the seminal work by Blanchard et al. at microwave frequencies and extended to a 1-D system in the millimeter-wave regime. This technique relies on using the spatial Fourier transform properties of an optical lens to perform the numerous correlations required to regenerate the image from the sampled n-v plane. In fact, digital correlation algorithms are essentially methods for performing discrete spatial Fourier transforms and require increasingly numerous correlations ($\sim n^2/2$ for n nodes) as the number of antenna nodes grows. Using the smaller optical wavelengths, Fourier transform operations may be carried out using a simple small optical lens and a photodetector array. Thus, the sampled image is generated in real time without the use of complicated correlation engines.

Conceptually, this approach may be interpreted as a technique for:

(1) Discretely sampling the complex amplitude of the millimeter-wave signal;

(2) Converting the captured complex amplitude to optical wavelengths;

(3) Routing up-converted signals to a central processor fiber array that mimics the millimeter-wave array format;

(4) Performing a continuous spatial Fourier transform of the discretely sampled aperture using simple optics at shorter wavelengths where the diffraction limit does not inhibit resolution; and (5) Capturing regenerated imagery in real time using a standard optical detector array.

The optically based image reconstruction requires that the position of the fiber arrays directly map in a scaled fashion to the position of the millimeter-wave antennas (otherwise know as homothetic mapping). This means that the optical fibers outputs must be precisely positioned to match that of the antenna array, thereby necessitating the ability to precisely and arbitrarily place fibers in an array that matches the optimal antenna array. An added complication is the requirement that the optical fibers all launch a common optical polarization, which may necessitate the use of polarization maintaining fibers aligned to a common launch axis. To ease the fabrication of the fiber optic array, a hexagonally packed array with a 250 μm pitch may be used. This also enables the use of a commercially available lens array. One example of a configuration that may ease fabrication of the fiber optic array is a hexagonally packed array, e.g. one having a 250 μm pitch; however, the invention is not thus limited. A hexagonally packed fixture that maps the hexagonally packed fiber array and an assembly that includes the horn antenna, waveguide to coax converter and electro-optic modulator may be created that enables the reconfiguration of the RF receivers in the array.

Phase Control System and Method

In addition to the invention DAI approach using optical up-conversion, exemplary embodiments provide for the creation of a high power, narrow beam-width (i.e., diffraction limited) optical signal by combining multiple high power optical signals and controlling the phase on each channel, as described in detail below. By precisely controlling the phase across a 2-D array, the signal can be scanned or steered. Thus, embodiments of the invention are relevant to defense, communication, and medical applications.

Figure 3A:
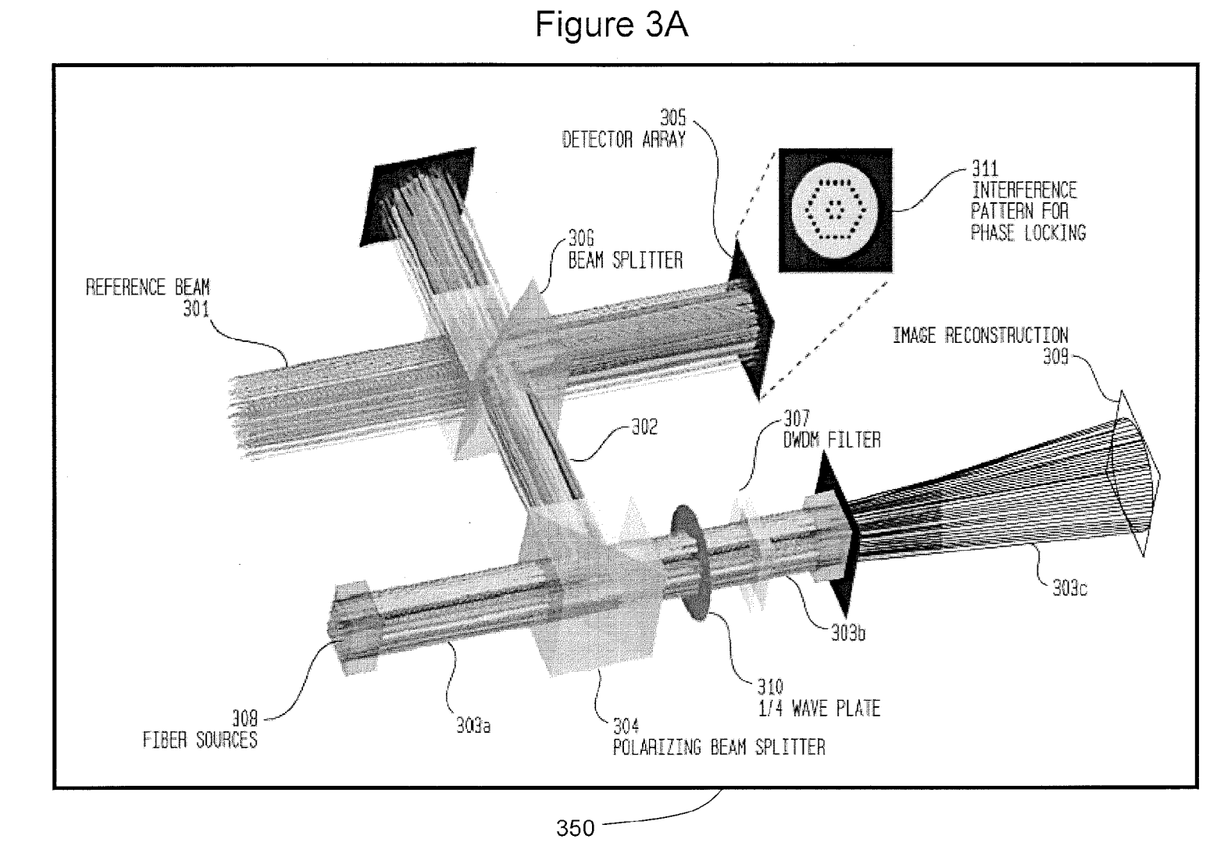
FIGS. 3A and 3B, is an exemplary diagram of an embodiment of the invention, illustrating a plurality of elements configured as two concentric hexagonal rings that may be used to create a distributed aperture, as well as various system components.
Figure 3B:
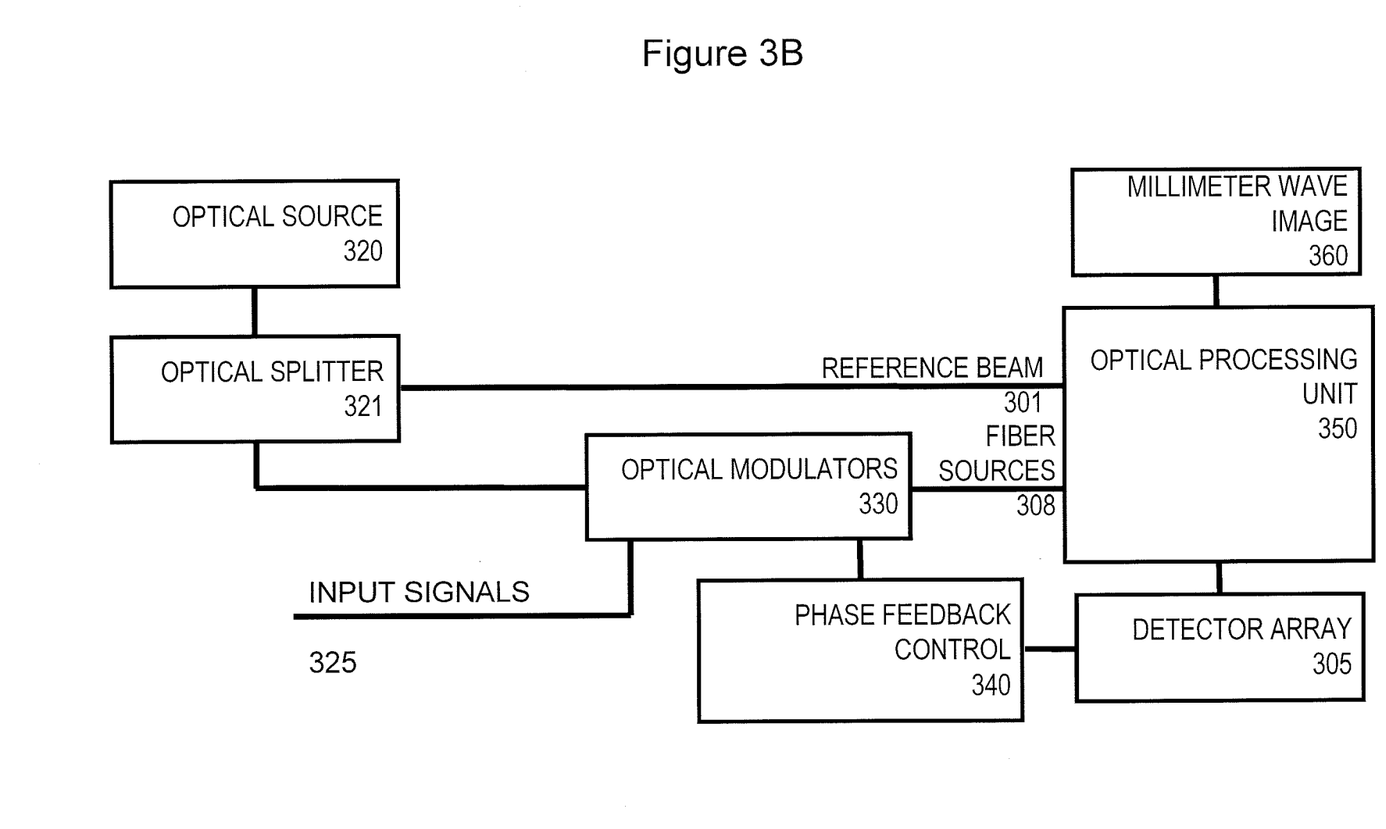

FIG. 3, comprising FIG. 3A and FIG. 3B, illustrates an exemplary embodiment of the system of the invention that illustrates how interference between reference beam 301 and optical carriers 302 may create a signal at the detector array 305 that can be used to control the relative phase of each channel. As shown in the exemplary embodiment of FIG. 3A, a plurality of elements, e.g., thirty (30) elements, may be configured as two concentric hexagonal rings that may be used to create a distributed aperture. The optical paths 303a, 303b, 303c represent millimeter-wave induced optical sidebands that may be passed through the dense wavelength division multiplexing (DWDM) filter 307 to create the reconstructed image 309. The interference pattern for phase locking is shown as 311, which may be obtained by a detector array 305. The apparatus shown in FIG. 3A may be characterized as an "optical processing unit" 350, in that it performs optical processing of optical signals. Optical processing system 350 may be incorporated into an overall phase control system, e.g., as shown in FIG. 3B. Input signals 325, e.g., millimeter-wave input signals, as discussed above, may be input to optical modulators 330, which may be used to perform the optical up-conversion as discussed above. An optical source 320 may be used to generate optical carriers, which may be split, e.g., by an optical splitter 321, into reference beam 301, as shown in FIG. 3A, and a set of optical carriers to be used by optical modulators 330. Reference beam 301 and the output of optical modulators 330, the latter of which are labeled as fiber sources 308, may then be provided as inputs to optical processing unit 350, as shown in FIG. 3A. As shown in FIG. 3A, one output of optical processing unit 350 may be an image, e.g., a millimeter-wave image 360, which corresponds to the output of image reconstruction 309 of FIG. 3A. Another output of optical processing unit 350 may be an interference pattern 311 for phase locking, which may be output by detector array 305, shown in both FIG. 3A and FIG. 3B. The output of detector array 305 may then be processed to provide phase feedback control 340 to optical modulators 330, which may be used to appropriately set phases of the optical carriers in fiber sources 308.

DWDM, as commonly understood, is a technology that puts data from different sources together on an optical fiber, with each signal carried at the same time on its own separate light wavelength. DWDM is a form of wave length division multiplexing (WDM); however, since WDM is increasingly more "dense" all the time, both terms are may be used synonymously. Using DWDM, up to 80 (and theoretically more) separate wavelengths or channels of data can be multiplexed into a lightstream transmitted on a single optical fiber.

Figure 4:
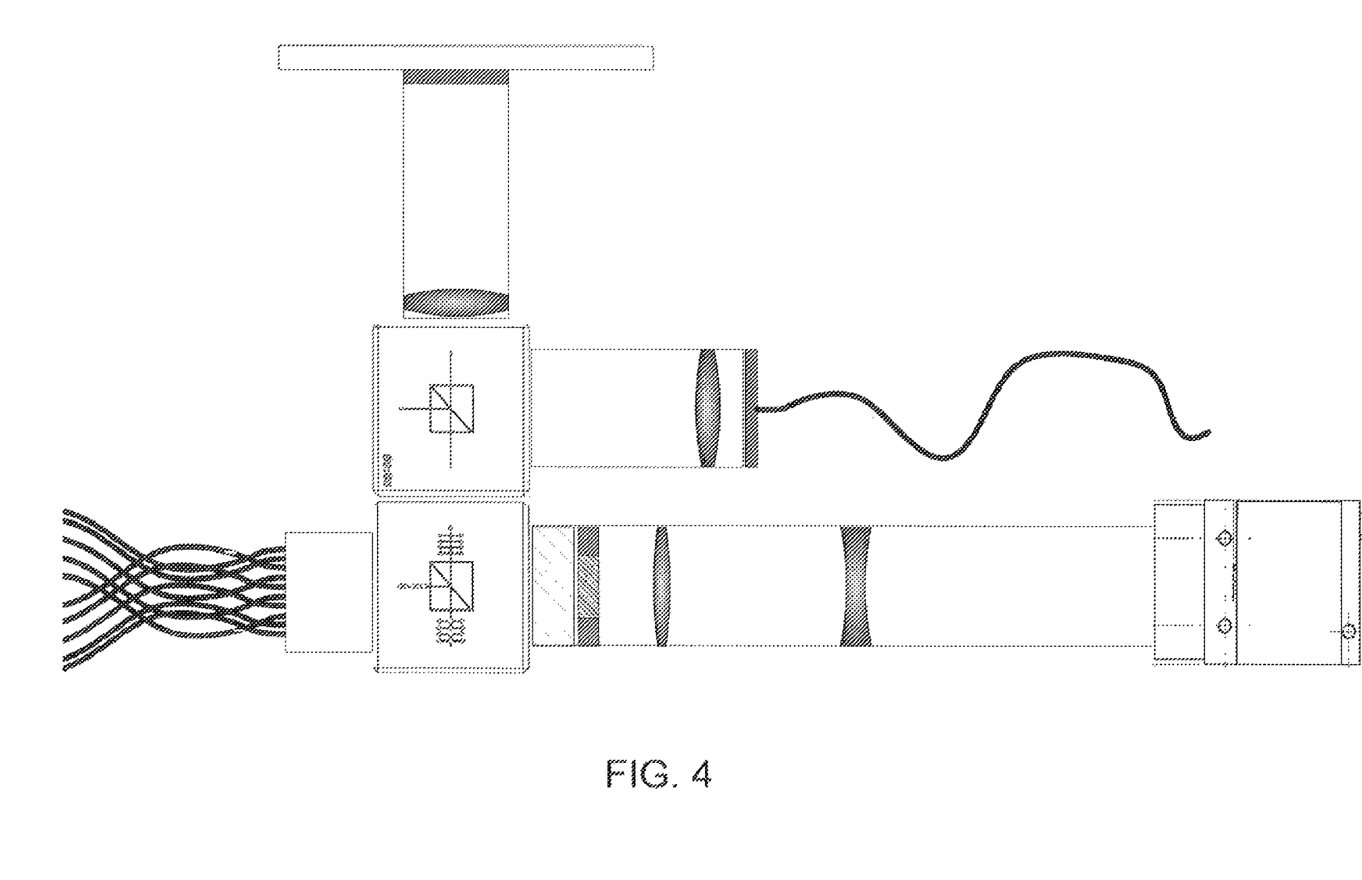
FIG. 4 is an exemplary drawing of another embodiment of a method of the invention showing various components of the system in the laboratory.

FIG. 4 is a drawing of an exemplary embodiment of the system of the invention that has been implemented in the laboratory. As shown in FIG. 4, incoming fiber array sources and reference beam are to the left, imaging camera to the right, and polarizing beam splitter, quarter (¼) wave plate, and DWDM filter are in the middle. The reference beam is combined with each optical channel with the beam splitter in the center of the photo and the detector array is mounted on the printed circuit board at the top of the photo. The polarizing beam splitter, beam splitter, fiber array sources, and ¼ wave plate are illustrated as 304, 306, 308, and 310 in FIG. 3.

In other exemplary embodiments, the system for controlling the phase of optical carriers may comprise: a first lenslet array configured to receive a plurality of optical sources; a polarizing beam splitter configured to split the plurality of optical sources from the lenslet array; a beam splitter configured to receive a first polarized output of the plurality of optical sources output from the polarizing beam splitter and a reference beam; a detector array with an interference pattern for phase locking configured to receive outputs from the beam splitter; a ¼ wave plate configured to receive a second polarized output of the plurality of optical sources output from the polarizing beam splitter; a DWDM filter configured to receive outputs from the ¼ wave plate; and a further lens or lenslet array configured to receive outputs from the DWDM filter and output a reconstructed image.

Additional exemplary embodiments of the invention provide a novel method for phase locking multiple coherent optical signals. The method may comprise: splitting an optical sources into a plurality of optical fibers, wherein a first split of the optical sources are a reference channel and a second split of the optical sources are a multiple carriers; distributing each of the carrier signals to a millimeter-wave detector array configured as a sparse aperture configuration; recombining optically up-converted signals in a scaled version of the millimeter-wave detector array; filtering one of the millimeter-wave side bands filtered from each optical source; and recombining the resulting signals to produce an optical version of the millimeter-wave scene onto a camera.

Figure 5:
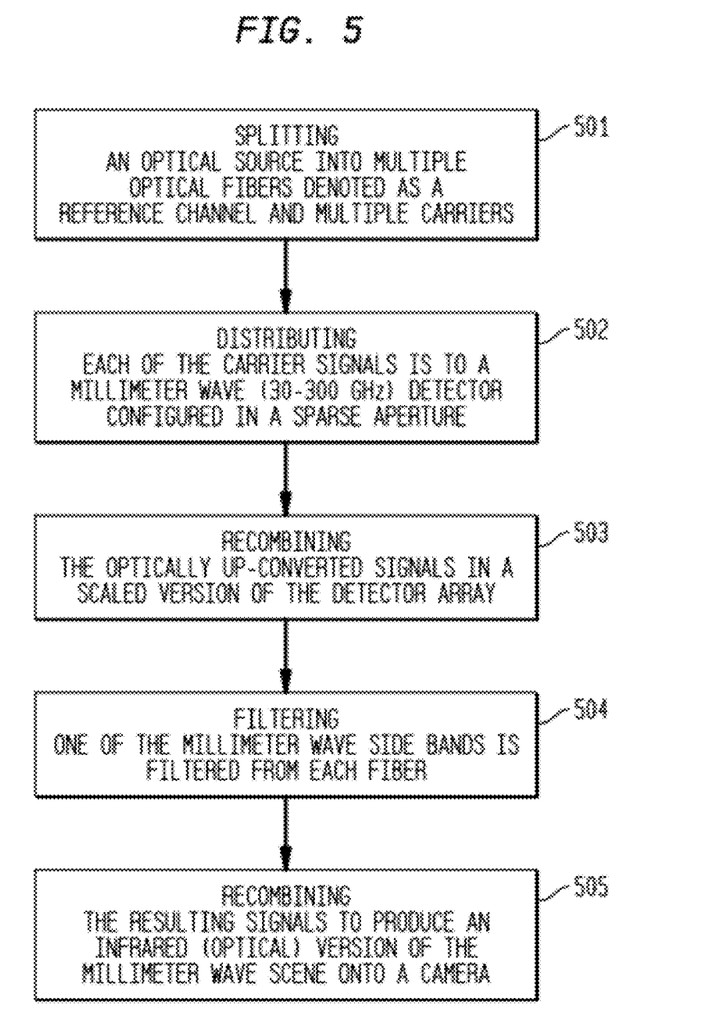
FIG. 5 is an exemplary flow diagram of an embodiment of a method of the invention showing how an optical source may be split into multiple optical fibers denoted as a reference channel and multiple carriers.

FIG. 5 is an exemplary flow diagram of an embodiment of a method of the invention. In block 501 of FIG. 5, an optical source may be split into multiple optical fibers denoted as a reference channel and multiple carriers. Each of the carrier signals may be distributed to a millimeter-wave (30 GHz to 300 GHz) detector configured in a sparse aperture configuration in block 502.

Generally, it should be understood that in telecommunications systems utilizing carrier signals, frequencies below 1 GHz are considered radio frequencies, frequencies from 1 GHz to 30 GHz are considered microwaves, and frequencies from 30 GHz to 300 GHz are considered millimeter-waves. In the invention, the imaging system can detect passively emitted signals in the 10 mm (30 GHz) to 3 mm (100 GHz) spectrum.

Block 503 shows recombining the optically up-converted signals in a scaled version of the detector array. One of the millimeter-wave side bands may be filtered from each fiber in block 504. In block 505, the resulting signals may be recombined to produce an infrared (optical) version of the millimeter-wave scene onto a camera.

In embodiments of the invention, for up-conversion of the millimeter-wave signal to an optical signal, an electro-optical modulator may modulate either an individual one of the two dual optical signal or (alternatively) modulate a combination of the two dual optical signals. In the former case, the modulator may be either an intensity modulator or a phase modulator while in the latter case the modulator may generally be an intensity modulator. A baseband signal (i.e., one containing information or data) may be applied to a control input of the modulator.

Other exemplary embodiments of the invention include a method for phase locking optical signals, which may comprise: collimating the optical signal output from a plurality of optical fibers; passing the optical signal out of each optical fiber and through a polarizing beam splitter followed by a quarter wave plate, wherein the quarter wave plate rotates the polarization of the optical signals and the filter is substantially a DWDM filter; passing the polarized and rotated optical signals through a narrow band optical band-pass filter centered on at least one of an upper or lower millimeter-wave side band wavelength; passing at least one of the optically up-converted millimeter-wave signal sidebands through a filter and creating an image on a camera; passing another sideband, reflected back through the quarter wave plate, rotated in polarization again, and redirected off axis by the polarization beam splitter; expanding and overlaying a reference beam with optical carrier signals using a beam splitter; reading interference between the reference beam and each of the optical carrier signals with a millimeter-wave detector array; wherein the two coherent beams are mixed and a relative phase is converted into an amplitude in each millimeter-wave detector array; and adjusting phase of each of the millimeter-wave detectors to maintain a fixed signal amplitude, or phase, on each of the channels is provided by using electrical phase control feedback.

Figure 6:
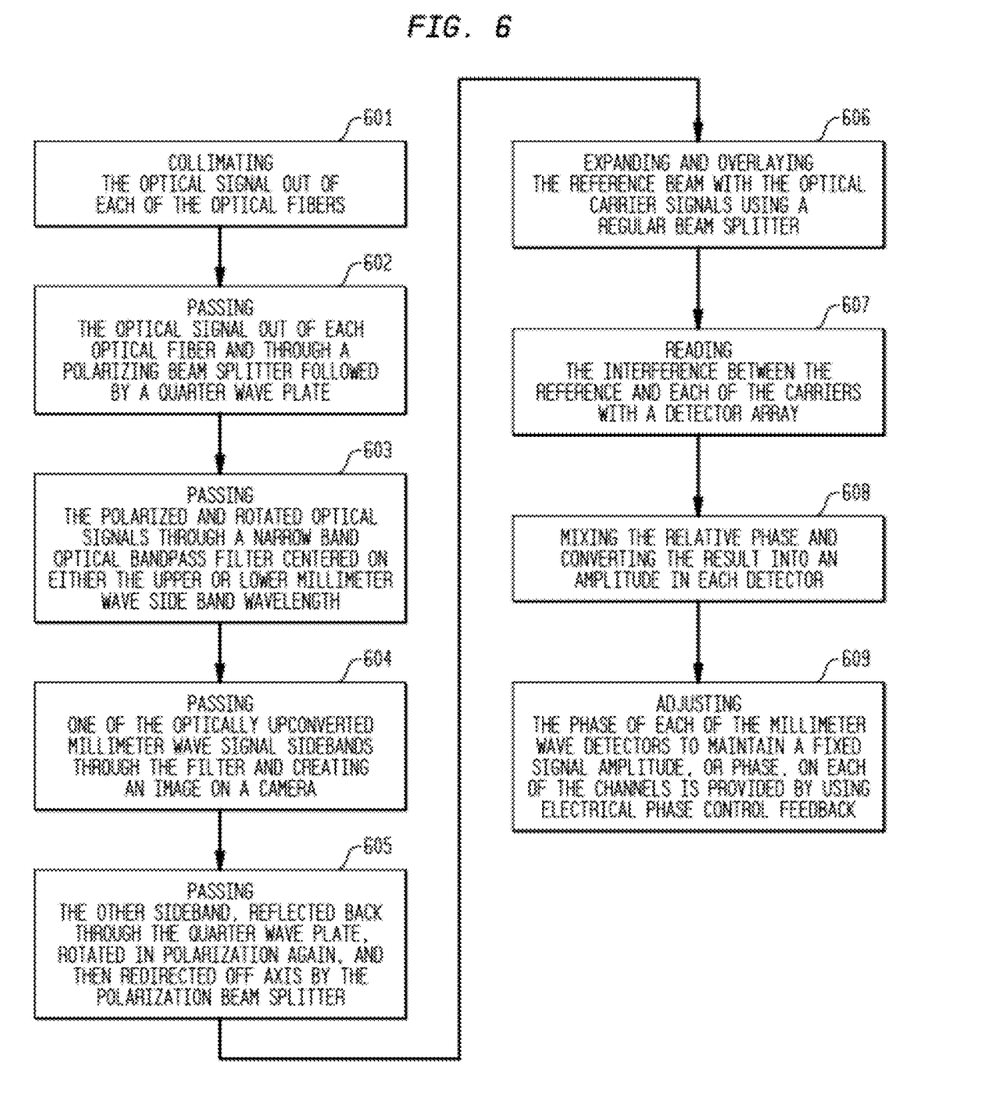
FIG. 6 is an exemplary flow diagram of another embodiment of a method of the invention showing a phase locking method that involves collimating the optical signal out of each of the optical fibers.

FIG. 6 provides an exemplary flow diagram of the above method of the invention. In particular, FIG. 6 discloses an exemplary phase locking method that involves collimating the optical signal out of each of the optical fibers in block 601. Block 602 shows passing the optical signal out of each optical fiber and through a polarizing beam splitter followed by a quarter wave plate, wherein the quarter wave plate may then rotate the polarization of the optical signals; the filter may be similar to a DWDM filter used in telecommunication systems. Passing the polarized and rotated optical signals through a narrow band optical band-pass filter centered on either the upper or lower millimeter-wave side band wavelength may occur in block 603. Block 604 shows passing one of the optically up-converted millimeter-wave signal sidebands through the filter and creating an image on a camera. Passing the other sideband, reflected back through the quarter wave plate, rotated in polarization again, and then redirected off axis by the polarization beam splitter may occur in block 605. Block 606 may involve expanding and overlaying the reference beam with the optical carrier signals using beam splitter. Reading the interference between the reference and each of the carriers with a detector array may occur in block 607. In block 608, the two coherent beams may be mixed, and the relative phase may be converted into amplitude in each detector. Adjusting the phase of each of the millimeter-wave detectors to maintain a fixed signal amplitude, or phase, on each of the channels may be performed by using electrical phase control feedback in block 609.

In the embodiments above, the electrical phase control feedback can be performed by a field programmable gate array (FPGA) at kHz to hundreds of MHz rates allowing for the compensation of high frequency vibration induced phase noise. In addition, by phase modulating the reference signal, it is possible to set a unique phase on each channel which can be used to focus or beam steer the imaging array.

Moreover, a $2\pi$ phase shift ramp will generate sinusoidal interference signals on each channel. By determining when each channel's average (AC coupled) signal changes sign (+ to − or − to +) relative to a reference signal, the relative phase of each channel can be determined and adjusted. Further, the interference signal can also be digitized and the phase determined from the time of each transition as well.

In the above embodiments above, each of the millimeter-wave detectors may be an antenna and modulator to capture the desired signal and up-convert it onto the optical carrier. Moreover, each element of the sparse array may capture the phase and amplitude of the detected millimeter-wave signals, which may allow the sparse aperture configuration to achieve high resolution without the need for a large optical element and with many fewer detectors than in traditional FPA detectors. Further, this may enable the distributed aperture millimeter-wave imaging system to be lower in volume, weight, and cost. In particular, with distributed aperture imaging, as described above, one may create a large imaging aperture by combining the light from a series of distributed telescopes. By so doing, one can construct a fine-resolution imaging system with reduced volume.

The foregoing description illustrates and describes embodiments of the invention. Additionally, the disclosure shows and describes only the preferred embodiments of the invention, but as mentioned above, it is to be understood that the invention is capable of use in various other combinations, modifications, and environments and is capable of changes or modifications within the scope of the inventive concept as expressed herein, commensurate with the above teachings and/or skill or knowledge of the relevant art. The embodiments described hereinabove are further intended to explain best modes known of practicing the invention and to enable others skilled in the art to utilize the invention in such or other embodiments and with the various modifications required by the particular applications or uses of the invention. Accordingly, the description is not intended to limit the invention to the form or application disclosed herein. Also, it is intended that the appended claims be construed to include alternative embodiments.

What is claimed is:

1. A phase controlling system comprising:
   an optical arrangement configured to cause interference between two or more optical channels and at least one reference beam coherently related to the two or more optical channels;
   an optical detector coupled to receive the interference generated by the optical arrangement and configured to detect an interference pattern; and
   a phase feedback control arrangement configured to control at least one phase of the two or more optical channels based on an output of the optical detector that is determined by the detected interference pattern.

2. The system according to claim 1, further comprising an array of detector elements arranged to form a distributed aperture array and coupled to provide outputs to be modulated or encoded onto the two or more optical channels.

3. The system according to claim 2, further comprising an array of optical modulators coupled to receive outputs of the detector elements and to modulate the outputs onto the optical channels.

4. The system according to claim 3, wherein the optical modulators are further configured to control the relative phases in each element of the array.

5. The system according to claim 2, wherein the detector elements are microwave or
   millimeter-wave elements.

6. The system according to claim 2, wherein the optical channels are routed to a central optical processing unit containing the phase controlling system.

7. The system according to claim 2, wherein the output of the detector elements is routed to an optical processing unit via fiber optic transmission lines.

8. The system according to claim 2, wherein the relative phases of the two or more optical channels are controlled to provide beam steering of the distributed array.

9. The system according to claim 2, wherein the relative phases of the two or more optical channels are controlled to provide beam focus of the distributed array.

10. The system according to claim 2, wherein the encoded signals are separated from at least one carrier of the two or more optical channels by means of an optical filter.

11. The system according to claim 1, wherein the reference beam is dithered to enable absolute measurement of the relative phases of the two or more optical channels.

12. The method according to claim 11, wherein the interference signal is digitized and the phase determined from the time of each transition.

13. A phase controlling method comprising:
    splitting optical sources into a plurality of optical fibers, wherein one split of the optical sources is a reference channel and the remaining splits of the optical sources are multiple optical channels;
    modulating a known pattern onto the multiple channels to obtain modulated optical channels;
    interfering the modulated optical channels with the reference channel; and
    detecting an interference output and using the interference output to control phases of the multiple optical channels.

14. The method according to claim 13, which further comprises modulating or encoding one or more outputs of an array of detector elements of a distributed aperture array onto at least one of the optical channels.

15. The method according to claim 14, which further comprises coupling an array of optical modulators receive outputs of the detector elements and modulating the outputs onto the optical channels.

16. The method according to claim 15, which further comprises the optical modulators controlling the relative phases in each element of the array.

17. The method according to claim 14, wherein the detector elements are microwave or millimeter-wave elements.

18. The method according to claim 14, which further comprises routing the modulated channels to a central optical processing unit containing a phase controlling system.

19. The method according to claim 14, which further comprises routing the output of the detector elements to an optical processing unit via fiber optic transmission lines.

20. The method according to claim 14, which further comprises controlling the relative phases of the multiple optical channels to provide beam steering of the distributed array.

21. The method according to claim 14, which further comprises controlling the relative phases of the multiple optical channels to provide beam focus of the distributed array.

22. The method according to claim 14, which further comprises separating the one or more modulated or coded outputs from at least one optical carrier in the multiple optical channels by means of an optical filter.

23. The method according to claim 13, which further comprises dithering the reference channel to enable absolute measurement of the relative phases of the multiple optical channels.

24. The method according to claim 23, which further comprises digitizing the interference output and determining a phase from one or more transition times.

* * * * *